United States Patent
Cui et al.

(10) Patent No.: US 10,227,500 B2
(45) Date of Patent: Mar. 12, 2019

(54) MULTI-STAGE LATEX POLYMERS, PROCESS OF MAKING THE SAME, AND COATING COMPOSITIONS MADE THEREOF

(71) Applicants: Rohm and Haas Company, Philadelphia, PA (US); Dow Global Technologies LLC, Midland, MI (US)

(72) Inventors: Wei Cui, Shanghai (CN); Tao Wang, Shanghai (CN); Longlan Cui, Shanghai (CN); James C. Bohling, Lansdale, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/311,624

(22) PCT Filed: Jun. 20, 2014

(86) PCT No.: PCT/CN2014/080359
§ 371 (c)(1),
(2) Date: Nov. 16, 2016

(87) PCT Pub. No.: WO2015/192363
PCT Pub. Date: Dec. 23, 2015

(65) Prior Publication Data
US 2017/0096575 A1     Apr. 6, 2017

(51) Int. Cl.
| | | |
|---|---|---|
| C08F 275/00 | (2006.01) | |
| C08F 230/02 | (2006.01) | |
| C09D 133/14 | (2006.01) | |
| C08F 220/18 | (2006.01) | |
| C09D 133/08 | (2006.01) | |
| C09D 151/00 | (2006.01) | |
| C09D 143/02 | (2006.01) | |

(52) U.S. Cl.
CPC .......... *C09D 133/14* (2013.01); *C08F 220/18* (2013.01); *C08F 275/00* (2013.01); *C09D 133/08* (2013.01); *C09D 143/02* (2013.01); *C09D 151/003* (2013.01); *C08F 2220/1825* (2013.01); *C08L 2308/00* (2013.01)

(58) Field of Classification Search
CPC .............................. C08F 275/00; C08F 230/02
See application file for complete search history.

(56) References Cited

U.S. PATENT DOCUMENTS

| | | | | |
|---|---|---|---|---|
| 4,876,313 | A * | 10/1989 | Lorah | C08F 265/06 |
| | | | | 525/281 |
| 5,385,960 | A | 1/1995 | Emmons et al. | |
| 5,663,224 | A | 9/1997 | Emmons et al. | |
| 6,576,051 | B2 | 6/2003 | Bardman et al. | |
| 7,179,531 | B2 | 2/2007 | Brown et al. | |
| 7,265,166 | B2 | 9/2007 | Gebhard et al. | |
| 8,039,065 | B2 | 10/2011 | Ikeda et al. | |
| 9,029,465 | B2 * | 5/2015 | Bohling | C08F 2/001 |
| | | | | 524/458 |
| 2004/0054063 | A1 * | 3/2004 | Brown | C08F 2/001 |
| | | | | 524/500 |
| 2005/0107527 | A1 * | 5/2005 | Holub | C08F 2/001 |
| | | | | 524/817 |
| 2005/0222299 | A1 | 10/2005 | Garzon et al. | |
| 2011/0008399 | A1 | 1/2011 | Bugnon et al. | |

FOREIGN PATENT DOCUMENTS

| | | | |
|---|---|---|---|
| CN | 102417776 A | 4/2012 | |
| EP | 2426155 A1 | 3/2012 | |
| WO | 2013016402 A1 | 1/2013 | |
| WO | WO 2013016402 A1 * | 1/2013 | .............. C08F 2/001 |

OTHER PUBLICATIONS

International Search Report for International Application No. PCT/CN2014/080359; International Filing Date Jun. 20, 2014; dated Feb. 26, 2015; 4 pages.
International Preliminary Report of Patentability; International Application No. PCT/CN2014/080359; International Filing Date Jun. 20, 2014; dated Dec. 20, 2016; 5 pages.
Written Opinion of the International Searching Authority; International Application No. PCT/CN2014/080359; International Filing Date Jun. 20, 2014; dated Feb. 26, 2015; 4 pages.

* cited by examiner

*Primary Examiner* — Karuna P Reddy
(74) *Attorney, Agent, or Firm* — Karl E. Strauss; Cantor Colburn LLP

(57) ABSTRACT

A latex polymer of multi-stage polymerization comprising a first stage polymer and a second stage polymer wherein the first stage polymer comprises a first portion of an acrylic monomer and a first portion of a phosphorus acid monomer, and the second stage polymer comprises a second portion of an acrylic monomer and a second portion of a phosphorus acid monomer. A process of making such latex polymer.

9 Claims, No Drawings

MULTI-STAGE LATEX POLYMERS, PROCESS OF MAKING THE SAME, AND COATING COMPOSITIONS MADE THEREOF

FIELD OF THE INVENTION

The present invention relates to a latex polymer, a process of making the latex polymer, and a coating composition made from the latex polymer.

INTRODUCTION

Benefits of phosphorus-containing monomers such as phosphoethyl methacrylate (PEM) have long been recognized in the coating industry. Coatings, especially high pigment volume content (PVC) coatings with PVC higher than 60%, comprising polymer dispersions polymerized from such phosphorus-containing monomers have dramatically improved coating performances such as scrub resistance, stain resistance, corrosion resistance and durability. However, research has also shown that the content of phosphorus-containing monomers in a coating is often inversely correlated to coating viscosity stability.

It is therefore desired in the coating industry to have a phosphorus-containing polymer dispersion that provides a coating composition with both satisfactory coating viscosity stability and improved coating performances like scrub resistance, stain resistance, corrosion resistance and durability.

SUMMARY OF THE INVENTION

The present invention provides a latex polymer of multi-stage polymerization comprising a first stage polymer and a second stage polymer wherein the first stage polymer comprises a first portion of an acrylic monomer and a first portion of a phosphorus acid monomer, and the second stage polymer comprises a second portion of an acrylic monomer and a second portion of a phosphorus acid monomer. The amount of the first portion of the phosphorus acid monomer is from 2 to 8 weight percent of the weight of the first stage polymer. The amount of the second portion of the phosphorus acid monomer is from 41 to 150 weight percent of the weight of the first portion of the phosphorus acid monomer. The first portion of the acrylic monomer is from 5 to 20 weight percent of the first and the second portions of the acrylic monomer. The monomers are selected so that the Tg of the latex polymer is in the range of −20° C. to 50° C.

The present invention further provides an aqueous coating composition corrtprising the latex polymer.

DETAILED DESCRIPTION OF THE INVENTION

The present invention provides a latex polymer of multi-stage polymerization comprising a first stage polymer and a second stage polymer. The first stage polymer comprises a first portion of an acrylic monomer and a first portion of a phosphorus acid monomer. The second stage polymer comprises a second portion of an acrylic monomer and a second portion of a phosphorus acid monomer. The amount of the first portion of the phosphorus acid monomer is from 2 to 8, preferably from 3 to 7, and more preferably from 4 to 6 weight percent of total weight of the first stage polymer. The amount of the second portion of the phosphorus acid monomer is from 41 to 150, preferably from 41 to 120, and more preferably from 41 to 99 weight percent of total weight of the first portion of the phosphorus acid monomer. The first portion of the acrylic monomer is from 5 to 20, preferably from 6 to 18, and more preferably from 8 to 15 weight percent of total weight of the first and the second portions of the acrylic monomer.

The monomers are selected so that the Tg of the latex polymer is in the range of from −20° C. to 50° C., preferably from −10° C. to 40° C., and more preferably from 0° C. to 30° C.

The present invention also provides a process comprising: a) contacting under emulsion polymerization conditions the first portion of the acrylic monomer with the first portion of the phosphorus acid monomer to form the first stage polymer; and b) contacting the first stage polymer with the second portion of the acrylic monomer and the second portion of the phosphorus acid monomer under emulsion polymerization conditions to form the latex polymer.

The Latex Polymer

The first portion of the phosphorus acid or acrylic monomer refers to one or more of the specified monomers used in the first stage of the multi-stage polymerization, i.e., step a) to make the first stage polymer. Similarly, the second portion of the phosphorus acid or acrylic monomer refers to one or more of the specified monomers used in the second stage of the multi-stage polymerization, i.e., step b). The acrylic and phosphorus acid monomers used in the first stage polymer may be the same as or different from the acrylic and phosphorus acid monomers used in the second stage polymer to make the latex polymer.

Suitable examples of the acrylic monomers include acrylates and methac ylates such as methyl methacrylate, ethyl methacrylate, ethyl acrylate, butyl acrylate, butyl methacrylate, and ethyl hexyl acrylate and any combinations thereof. Preferred combinations of the acrylic monomers include methyl methacrylate and one or more monomers selected from ethyl acrylate, butyl acrylate, and 2-ethylhexyl acrylate. More preferred combinations of the acrylic monomers include methyl methacrylate and butyl acrylate; methyl methacrylate and 2-ethylhexyl acrylate; and methyl methacrylate, butyl acrylate, and ethyl acrylate.

Suitable examples of the phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl(meth)acrylates, including phosphoethyl methacrylate (PEM) and phosphopropyl methacrylate, with PEM being particularly preferred.

Either or both of the first and the second stage polymerization steps may include contacting additional monomers under polymerization conditions. Suitable examples of the additional monomers include carboxylic acid functional monomers such as acrylic acid, methacrylic acid, and itaconic acid; sulfur acid functional monomers, including sulfoethyl (meth)acrylate, sulfopropyl (meth)acrylate, styrene sulfonic acid, vinyl sulfonic acid, and 2-(meth)acrylamido-2-methyl propanesulfonic acid, and salts thereof; vinyl esters such as vinyl acetate; and multifunctional monomers such as ureid.o methacrylate and acetoacetoxyethyl methacrylate.

The first stage polymer may further comprises from 0.1 to 30, preferably from 0.2 to 10, and more preferably from 0.2 to 5 weight percent of total weight of the first stage polymer, of a multiethylenically unsaturated monomer. The multiethylenically unsaturated monomer preferably contains two ethylenically unsaturated groups. Suitable examples of the multiethylenically unsaturated monomers include allyl methacrylate (ALMA), divinylbenzene (DVB) and ethyleneglycol dimethacrylate (EGDMA). Preferably, the multiethylenically unsaturated monomer is ALMA.

The multiethylenically unsaturated monomers, as used herein, do not include phosphorus acid monomers as described above for the purpose of clarity.

The second stage polymer may further comprises from 10 to 70, preferably from 25 to 65, and more preferably from 30 to 60 weight percent of total weight of the second stage polymer, of a styrene monomer. Suitable examples of the styrene monomers include styrene and vinyl toluene.

When a styrene monomer is included in either or both stages of the polymerization, it is preferred that the acrylic monomer is methyl methacrylate, ethyl acrylate, butyl acrylate, 2-ethylhexyl acrylate, or combinations thereof. The combination of styrene and butyl acrylate; styrene and ethylhexyl acrylate; or styrene, butyl acrylate, and methyl methacrylate is particularly preferred when styrene is used as an additional monomer.

The Aqueous Coating Composition

The latex polymer of the present invention is advantageously formulated into an aqueous coating composition along with coating formulation materials including one or more binders and thickeners and any of a number of ancillary materials including extenders; pigment particles, including encapsulated or partially encapsulated pigment particles and opaque pigment particles; dispersants; surfactants; defoamers; preservatives; flow agents; leveling agents; and neutralizing agents.

The formulation materials of the aqueous coating composition can be combined in any conventional order of addition. In a preferred embodiment, the latex polymer is advantageously contacted first with the pigment particles under shear to form a latex pigment composite. The latex pigment composite is then formulated into an aqueous coating composition along with other coating formulation materials described above.

The pigment particles have a refractive index of greater than 1.8, and suitable examples of the pigment particles include zinc oxide, antimony oxide, zirconium oxide, chromium oxide, iron oxide, lead oxide, zinc sulfide, lithopone, and anatase and rutile titanium dioxide. Preferably, the pigment particles are rutile $TiO_2$ particles and, particularly, rutile $TiO_2$ particles surface treated with oxides of aluminum and/or silicon.

The extenders are particulate inorganic materials having a refractive index of less than or equal to 1.8 and greater than 1.3, and suitable examples include calcium carbonate, clay, calcium sulfate, aluminosilicates, silicates, zeolites, mica, diatomaceous earth, $Al_2O_3$, zinc phosphate, solid or hollow glass, and ceramic beads.

In a preferred embodiment, the aqueous coating composition has a PVC of higher than 60%, preferably higher than 70%, and more preferably higher than 80%.

PVC of the aqueous coating composition is calculated as follows,

PVC(%)=[volume of pigment particle(s)+volume of extender(s)]/total dry volume of the aqueous coating composition.

The Aqueous Paper Coating Composition

The latex polymer could also be formulated into an aqueous coating composition for paper industry without involving pigment particles. The aqueous paper coating composition may further comprise one or more binders, thickeners, extenders, dispersants, surfactants, defoamers, preservatives, flow agents, leveling agents, and neutralizing agents.

EXAMPLES

I. Raw Materials

A) Monomers used in making the latex polymer

| Abbreviation | Chemical nature |
|---|---|
| BA | butyl acrylate |
| ST | styrene |
| ALMA | allyl methacrylate |
| MMA | methyl methacrylate |
| MAA | methacrylic acid |
| AA | acrylic acid |
| EHA | ethyl hexyl acrylate |
| AM | acrylamide |
| SSS | sodium styrene sulfonate |
| PEM | phosphoethyl methacrylate |
| tBHP | t-butyl hydroperoxide |
| IAA | isoascorbic acid |

B) Commercially available materials

| Material | Available from |
|---|---|
| NATROSOL ™ 250 MBR thickener | Ashland Aqualon Company |
| Propylene glycol | Sinopharm Chemical Reagent Co., Ltd. |
| AMP 95 base | The Dow Chemical Company |
| OROTAN ™ 1288 dispersant | The Dow Chemical Company |
| ECOSURF ™ BD-109 wetting agent | The Dow Chemical Company |
| NOPCO ™ NXZ defoamer | Nopco Chemicals Co. Ltd. |
| TI-PURE ™ R-902 pigment | E. I. du Pont de Nemours and Company |
| CC-700 extender | Guangfu Building Materials Group (China) |
| ASP ™ 170 extender | BASF Company |
| DB-80 extender | Guangfu Building Materials Group (China) |
| ROPAQUE ™ Ultra E opaque polymer | The Dow Chemical Company |
| COASOL ™ coalescent | The Dow Chemical Company |
| PRIMAL ™ TT-935 rheology modifier | The Dow Chemical Company |
| SILQUEST ™ A-171 silane | Momentive Performance Materials Inc. |
| VERSENE ™ chelating agent | Sinopharm Chemical Reagent Co., Ltd. |
| DISPONIL ™ FES 993 emulsifier | Cognis Corporation |
| DISPONIL ™ FES 32 emulsifier | Cognis Corporation |
| Sodium dodecyl benzene sulfonate | Cognis Corporation |
| RHODACAL ™ DS-4 emulsifier | Rhodia Specialty Chemicals Company |
| Sodium hydroxide | Sinopharm Chemical Reagent Co., Ltd. |
| Sodium persulfate | Sinopharm Chemical Reagent Co., Ltd. |
| Sodium bisulfate | Sinopharm Chemical Reagent Co., Ltd. |

II. Test Procedures

1. Viscosity Stability

A Stormer viscometer is used to test the viscosity of a coating composition according to the ASTM (American Society for Testing and Materials) D562 method. After the coating composition is formed, an initial medium shear viscosity, Initial KU, of the coating composition is tested at room temperature. The coating composition is then balanced at room temperature overnight. Then, the viscosity of the coating composition is measured and recorded as Overnight KU. The coating composition is then placed in an oven at about 50° C. for 10 days. The viscosity of the coating composition after storage is tested and recorded as Final KU. The difference between Initial KU and Overnight KU is defined as the viscosity change, ΔKU1. The difference between Initial KU and Final KU is defined as the heat-age viscosity change, ΔKU2. The total ΔKU is the sum of ΔKU1 and ΔKU2. The smaller the total ΔKU value, the better the viscosity stability.

2. Scrub Resistance

Coating drawdown was performed on a panel by using a 175 um film caster, starting from the secured end of the panel. Coating drawdown was then air-dried horizontally for 7 days in a Constant Temperature Room (CTR). A brush was soaked in soap water overnight before use, and was then mounted in a holder with the brush's bristle-side down to start the test. The scrub media is a 0.5% soap solution. More soap solution may be added onto coating drawdown if needed. The number of cycles for removing completely the coating drawdown was recorded.

III. Experimental Examples

1. Preparation of Comparative Latex Polymers (Comp. Latex) 1 to 3 by Single-Stage Polymerization A monomer emulsion was prepared by combining 430 g of DI water, 96.9 g of sodium dodecyl benzene sulfonate (19% active surfactant), 5.62 g of sodium styrene sulfonate (SSS), 34.42 g of acrylic acid (AA), 4.24 g of phosphoethyl methacrylate late (PEM), 733.58 g of butyl acrylate (BA), 921.23 g of styrene (ST) and 5.24 g of SILQUEST A-171 silane. 726 g of DI water and 6.5 g of sodium dodecyl benzene sulfonate (19% active surfactant) were added to a 5 L four-neck round-bottom flask equipped with a paddle stirrer, a thermometer, a nitrogen inlet, and a reflux condenser. The contents in the flask were heated to 90° C. under a nitrogen atmosphere with stirring. 57 g of the monomer emulsion obtained above was added to the stirred flask followed by adding 0.01 g $FeSO_4$, 0.02 g VERSENE chelating agent and a solution of 6.09 g sodium persulfate dissolved in 17 g DI water, and a rinse of 5 g DI water. After stirring for 10 minutes, the remainder of the monomer emulsion, with a rinse of 25 g DI water, a solution of 2.46 g sodium persulfate dissolved in 67 g DI water, and a solution of 2.6 g sodium bisulfate dissolved in 67 g DI water were added linearly and separately over 120 minutes from the flask, and stirring was continued at 84° C. When the feed was finished, the flask was cooled to 65° C., and 5.14 g of 70% active t-butyl hydroperoxide (tBHP) and 2.36 g of isoascorbic acid (IAA) were added to the flask. Then, a solution of NaOH (4% solids) was added to the flask to adjust pH to 7.5 to obtain the Comparative Latex Polymer 1.

The preparations of Comparative Latex Polymers 2 and 3 are the same to that for Comparative Latex Polymer 1 except that different phosphorus acid monomer amounts were used. Phosphorus acid monomer amounts in Comparative Latex Polymers 1 to 3 are listed in Table 1.

2. Preparation of Inventive Latex Polymers (Latex) 1 to 4 by Multi-Stage Polymerization A first stage monomer emulsion was prepared by combining 400 g of DI water, 128 g of 30% active DISPONIL PBS 993 emulsifier, 742.4 g of BA, 390.40 g of methyl methacrylate (MMA), 102.40 g of 65% active PEM, 25.60 g of methacrylic acid (MAA), and 19.20 g of allyl methacrylate (ALMA). 1250 g of DI water was added to a 5 L four-neck round-bottom flask equipped with a paddle stirrer, a thermometer, a nitrogen inlet, and a reflux condenser. The contents in the flask were heated to 84° C. under a nitrogen atmosphere with stirring. 42.6 g DISPONIL Fes 32 emulsifier (30% active), and 140 g of the first stage monomer emulsion were added to the stirred flask followed by adding a solution of 5.12 g sodium persulfate dissolved in 20 g DI water, and a rinse of 5 g DI water. The reaction temperature was cooled to below 80° C. and then back to 84° C. through reaction heat releasing. Then an initiator solution of 1.28 g sodium persulfate dissolved in 50 g DI water and the remainder of the first stage monomer emulsion were added into the flask over 50 minutes. After all were added in, the reaction temperature was cooled to 40° C. and 25 g ammonia (25% active) was added to the flask to adjust pH to 4 to get the first stage polymer.

A second stage monomer emulsion was prepared by combining 372.59 g of DI water, 63.87 g of RHODACAL DS-4 emulsifier (23% active), 594.05 g of BA, 757.58 g of ST, 27.97 g of AA and 4.15 g of SILQUEST A-171 silane. Then, 930 g of DI water was added to a 5 L four-neck round-bottom flask equipped with a paddle stirrer, a thermometer, a nitrogen inlet, and a reflux condenser. The contents in the flask were heated to 84° C. under a nitrogen atmosphere with stirring. 308.67 g of the first stage polymer was added to the stirred flask followed by adding a solution of 4.8 g sodium persulfate dissolved in 20 g DI water, and a rinse of 5 g DI water. The reaction temperature was cooled to 74° C. and then increased to 84° C. through reaction heat releasing. Then, an initiator solution of 2.40 g sodium persulfate and 2 g NaOH dissolved in 56 g DI water and the second stage monomer emulsion were fed into the flask linearly over 120 minutes. After all were fed in, the reaction temperature was cooled to 65° C. 4.2 g tBHP and 2.3 g IAA were added into the flask over 30 minutes while the temperature was kept dropping to below 50° C. Then, a solution of NaOH (4% solid) was added to the flask linearly over a period of 30 minutes to adjust final pH to 7.5 to get the latex polymer 1.

The preparations of the Inventive Latex Polymers 2, 3 and 4 are the same to that for Inventive Latex Polymer 1 except that different phosphorus acid monomer and acrylic monomer amounts were used, as shown in Table 2.

TABLE 1

| Latex Polymer ID | Characteristics | | | |
| --- | --- | --- | --- | --- |
| | Total P* (%) | $WS^a$ (%) | $PS^b$ (nm) | pH |
| Comp. Latex 1 | 0.16 | 48% | 125 | 8.0 |
| Comp. Latex 2 | 0.63 | 45% | 157 | 7.6 |
| Comp. Latex 3 | 1.10 | 46% | 101 | 7.7 |

*The weight percent of total weight of the phosphorus acid monomer based on total weight of the acrylic monomer;
$^a$WS = weight solids; and
$^b$PS = particle size.

TABLE 2*

| Latex Polymer ID | $A_1^c$ (%) | $P_2/P_1^d$ (%) | Total P = $P_1 + P_2^e$ (%) |
| --- | --- | --- | --- |
| Latex 1 | 8 | 48.9 | 0.62 |
| Latex 2 | 5 | 142.5 | 0.63 |
| Latex 3 | 10 | 22.5 | 0.64 |
| Latex 4 | 10 | 112.5 | 1.11 |

*The weight percent of the first portion of the phosphorus acid monomer based on total weight of the first stage polymer is 5.2%;
$^c$The weight percent of the first portion of the acrylic monomer based on total weight of the first and the second portions of the acrylic monomer;
$^d$The weight percent of the second portion of the phosphorus acid monomer based on total weight of the first portion of the phosphorus acid monomer; and
$^e$The weight percent of the first and the second portions of the phosphorus acid monomer based on total weight of the first and the second portions of the acrylic monomer.

3. Preparation of Coatings 1 to 7

Coating 1 was prepared using the following procedure. The Grind stage ingredients listed in Table 3 were mixed using a high speed Cowles disperser. The Let-down stage ingredients listed in Table 3 were added using a conventional lab mixer. Grind stage is the first stage in coating preparation where powders like pigment particles, extenders were dispersed in water to make an aqueous dispersion. Let-down stage is the second stage in coating preparation where let-down stage ingredients in dispersions or solutions were added to make a final coating.

TABLE 3

| Material | Weight (g) |
|---|---|
| Coating 1 formulation | |
| "Grind stage" | |
| Water | 330.50 |
| OROTAN 1288 dispersant | 5.00 |
| NOPCO NXZ defoamer | 2.00 |
| NATROSOL 250 MBR thickener | 5.00 |
| AMP 95 base | 0.10 |
| TI-PURE R-902 pigment | 72.00 |
| DB-80 extender | 90.00 |
| ASP 170 extender | 30.00 |
| CC-700 extender | 278.00 |
| "Let-down stage" | |
| Comparative Latex Polymer 1 | 120.00 |
| Propylene glycol | 10.00 |
| COASOL coalescent | 12.43 |
| ROPAQUE Ultra E opaque polymer | 15.00 |
| ECOSURF BD-109 wetting agent | 2.00 |
| PRIMAL ™ TT-935 rheology modifier | 0.00 |
| AMP 95 | 0.00 |
| Water | 27.97 |
| Total | 1000.00 |
| Coating 1 characteristics | |
| Total PVC | 77% |

The preparations of Coatings 2 to 7 are the same to that for Coating 1 except that different Latex Polymers were used, as shown in Table 4.

IV. Results

TABLE 4

| Coating ID | Latex Polymer | phosphorus acids (%) Total P[f] | $P_2/P_1$ | Scrub Resistance ratio[g] | Viscosity ΔKU1 | ΔKU2 | Total ΔKU |
|---|---|---|---|---|---|---|---|
| 1* | Comp. Latex 1 | 0.16 | — | 100% | 5.4 | −0.2 | 4.2 |
| 2* | Comp. Latex 2 | 0.63 | — | 139% | 9.1 | 11.7 | 20.8 |
| 3 | Latex 1 | 0.62 | 48.9 | 163% | 13.0 | 1.4 | 14.4 |
| 4 | Latex 2 | 0.63 | 142.5 | 122% | 6.1 | 8.3 | 14.4 |
| 5* | Latex 3 | 0.64 | 22.5 | 78% | 12.0 | −1.0 | 11.0 |
| 6* | Comp. Latex 3 | 1.1 | — | 140% | 19.5 | >18.0 | >37.5 |
| 7 | Latex 4 | 1.1 | 112.5 | 134% | 11.0 | 11.9 | 22.9 |

*Coatings 1, 2, 5 and 6 were comparative coating examples comprising Comparative Latex Polymers 1, 2, 3 and Inventive Latex Polymer 3 respectively;
[f]The weight percent of the total weight of the phosphorus acid monomer based on total weight of the acrylic monomer;
[g]The scrub resistance ratios were the ratios of the scrub resistances of coatings 2 through 7 respectively compared with that of coating 1, which was 2104 and was defined as 100% herein.

Scrub resistance and viscosity of Coatings 1 to 7 were described in Table 4. As shown in the table, Coating 1 comprising 0.16% phosphorus acid monomer based on total weight of the acrylic monomer was defined as a control, and had a 100% scrub resistance ratio. Each scrub resistance of Coatings 2 to 7 was a relative ratio compared with that of Coating 1. Coating 2, with a phosphorus acid monomer amount of 0.63%, compared with Coating 1, had a better scrub resistance (139% compared with 100%) but a poorer viscosity stability (20.8 compared with 4.2). The trend was clear that the higher the phosphorus acid amount, the poorer the viscosity stability. Coatings 3 and 4, compared with Coating 2, had the same phosphorus acid monomer amounts, and therefore, had similarly good scrub resistance, but with improved viscosity stability (14.4 compared with 20.8). It was concluded that by multi-stage polymerization, with defined phosphorus acid monomer amounts in each stage, coating's viscosity stability was improved compared to those made from single polymerization.

Coating 5, compared with Coatings 3 and 4, had a lower $P_2/P_1$ ratio (the weight percent of the second portion of the phosphorus acid monomer based on total weight of the first portion of the phosphorus acid monomer), and had a poorer scrub resistance (78%) even when the total phosphorus acid monomer amount did not change. It indicated that the $P_2/P_1$ ratio also played a critical role in coating performance, such as, scrub resistance.

Coating 6 had similar results as Coating 2 indicating the trend that the higher the phosphorus acid amount was, the poorer the viscosity stability was. Coating 7, compared with Coating 6, and comprised a multi-stage polymerized latex polymer with the $P_2/P_1$ ratio within the limitation of the present invention, achieved a much better viscosity stability (22.9 compared with >37.5).

What is claimed is:

1. A latex polymer of multi-stage polymerization comprising a first stage polymer and a second stage polymer wherein the first stage polymer comprises a first portion of an acrylic monomer and a first portion of a phosphorus acid monomer, and the second stage polymer comprises a second portion of an acrylic monomer and a second portion of a phosphorus acid monomer;

wherein the amount of the first portion of the phosphorus acid monomer is from 4 to 6 weight percent of total weight of the first stage polymer;

the amount of the second portion of the phosphorus acid monomer is from 49 to 99 weight percent of total weight of the first portion of the phosphorus acid monomer;

the first portion of the acrylic monomer is from 8 to 15 weight percent of total weight of the first and the second portions of the acrylic monomer;

the Tg of the latex polymer is in the range of 0° C. to 30° C., wherein at least one of the first and the second portions of the phosphorus acid monomer is selected from phosphoethyl methacrylate and phosphopropyl methacrylate; and at least one of the first and the second portions of the acrylic monomers comprises methyl methacrylate.

2. The latex polymer of claim 1 wherein at least one of the first and the second portions of the phosphorus acid monomer comprises phosphoethyl methacrylate.

3. The latex polymer of claim 1 wherein at least one of the first and the second portions of the acrylic monomers further comprises ethyl acrylate, butyl acrylate, 2-ethylhexyl acrylate, or any combination thereof.

4. The latex polymer of claim 1 wherein the first stage polymer further comprises from 0.1 to 30 weight percent, based on total weight of the first stage polymer, of a multiethylenically unsaturated monomer.

5. The latex polymer of claim 4 wherein the multiethylenically unsaturated monomer comprises allyl methacrylate.

6. The latex polymer of claim 1 wherein the second stage polymer further comprises from 10 to 70 weight percent, based on total weight of the second stage polymer, of a styrene monomer.

7. A process of preparing a latex polymer of claim 1, the process comprising a) contacting under emulsion polymerization conditions a first portion of an acrylic monomer with a first portion of a phosphorus acid monomer to form a first stage polymer; and b) contacting the first stage polymer with a second portion of an acrylic monomer and a second portion of a phosphorus acid monomer under emulsion polymelization conditions to form a latex polymer; wherein the amount of the first portion of the phosphorus acid monomer is from 4 to 6 weight percent of total weight of the first stage polymer; the amount of the second portion of the phosphorus acid monomer is from 49 to 99 weight percent of total weight of the first portion of the phosphorus acid monomer; the first portion of the acrylic monomer is from 8 to 15 weight percent of total weight of the first and the second portions of the acrylic monomer: and the Tg of the latex polymer is in the range of 0° C. to 30° C. wherein at least one of the first and the second portions of the phosphorus acid monomer is selected from phosphoethyl methacrylate and phosphopropyl methacrylae; and at least one of the first and the second portions of the acrylic monomers comprises methyl methacrylate.

8. An aqueous coating composition of higher than 60% pigment volume content, comprising the latex polymer of claim 1, pigment particles, an extender, a binder and a dispersant.

9. An aqueous paper coating composition of higher than 60% pigment volume content, comprising the latex polymer of claim 1, an extender, a binder and a dispersant.

* * * * *